United States Patent
Bujak et al.

(10) Patent No.: US 9,643,480 B2
(45) Date of Patent: May 9, 2017

(54) ASSEMBLY BEARING ARRANGEMENT FOR MOTOR VEHICLES

(71) Applicant: AUDI AG, Ingolstadt (DE)

(72) Inventors: Marek Bujak, Wellheim (DE); Stefan Vollmann, Ingolstadt/Gerolfing (DE)

(73) Assignee: AUDI AG, Ingolstadt (DE)

( * ) Notice: Subject to any disclaimer, the term of this patent is extended or adjusted under 35 U.S.C. 154(b) by 41 days.

(21) Appl. No.: 14/787,671

(22) PCT Filed: Apr. 5, 2014

(86) PCT No.: PCT/EP2014/000917
§ 371 (c)(1),
(2) Date: Oct. 28, 2015

(87) PCT Pub. No.: WO2014/177245
PCT Pub. Date: Nov. 6, 2014

(65) Prior Publication Data
US 2016/0059685 A1    Mar. 3, 2016

(30) Foreign Application Priority Data

Apr. 30, 2013  (DE) .................. 10 2013 007 460

(51) Int. Cl.
*B60K 5/12*    (2006.01)
*B62D 21/11*    (2006.01)

(52) U.S. Cl.
CPC .......... *B60K 5/1291* (2013.01); *B60K 5/1208* (2013.01); *B62D 21/11* (2013.01)

(58) Field of Classification Search
CPC ..... B60K 5/1291; B60K 5/1208; B62D 21/11
(Continued)

(56) References Cited

U.S. PATENT DOCUMENTS 8,973,980 B2 * 3/2015 Mildner ............... B62D 25/088
                                                   296/192
9,517,796 B2 * 12/2016 Balzer .................... B62D 21/11

FOREIGN PATENT DOCUMENTS

CN       101850712 A      10/2010
DE    10 2004 034 074      2/2006
(Continued)

OTHER PUBLICATIONS

International Search Report issued by the European Patent Office in International Application PCT/EP2014/000917.
(Continued)

*Primary Examiner* — Faye M Fleming
(74) *Attorney, Agent, or Firm* — Henry M. Feiereisen LLC

(57) ABSTRACT

An assembly bearing arrangement for a motor vehicle includes an assembly bearing having a bearing housing, a vibration-damping bearing, and a bearing core connectable to a power train element. The bearing housing is connected with a body-fixed carrier part by a first fastening element, oriented in a direction that differs from a vertical direction, in a torsion-resistant manner, and by a second fastening element, oriented substantially in the vertical axis direction. A U-shaped stop bracket bridges the bearing core and is firmly connected to the bearing housing. The bearing core is formed with diametrically opposite stop arms, which in basic position are spaced from legs of the stop bracket by a gap distance. A first stop buffer is arranged on inner surfaces of the stop bracket and/or the bearing core, and second stop buffers are arranged on the legs of the stop bracket and/or the stop arms between the legs and the stop arms.

25 Claims, 2 Drawing Sheets

(58) Field of Classification Search
USPC .......................................................... 180/312
See application file for complete search history.

(56) References Cited

FOREIGN PATENT DOCUMENTS

| | | |
|---|---|---|
| DE | 10 2005 058 928 | 6/2006 |
| DE | 10 2004 062 083 | 7/2006 |
| DE | 10 2006 016 328 | 10/2006 |
| DE | 10 2005 033 509 | 1/2007 |
| DE | 10 2009 020 107 | 11/2010 |
| EP | 1 336 771 | 8/2003 |
| EP | 1 925 846 | 5/2008 |
| FR | 2 831 111 | 4/2003 |
| JP | 2012-240579 | 12/2012 |

OTHER PUBLICATIONS

Chinese Search Report issued on Dec. 29, 2016 with respect to counterpart Chinese patent application 201480024790.5.
Translation of Chinese Search Report issued on Dec. 29, 2016 with respect to counterpart Chinese patent application 201480024790.5.

* cited by examiner

ASSEMBLY BEARING ARRANGEMENT FOR MOTOR VEHICLES

CROSS-REFERENCES TO RELATED APPLICATIONS

This application is the U.S. National Stage of International Application No. PCT/EP2014/000917, filed Apr. 5, 2014, which designated the United States and has been published as International Publication No. WO 2014/177245 and which claims the priority of German Patent Application, Ser. No. 10 2013 007 460.6, filed Apr. 30, 2013, pursuant to 35 U.S.C. 119(a)-(d).

BACKGROUND OF THE INVENTION

The present invention relates to an assembly bearing arrangement for motor vehicles.

An assembly bearing assembly of the generic type is shown, for example, in DE 10 2004 062 083 A1 or DE 10 2005 033 509 B4, and has a bearing housing which can be secured to a body-mounted carrier part (this can be the vehicle body directly or a subframe attached thereto) of the motor vehicle, by screw connections aligned in Y direction (transverse direction). The subject matter of the first publication further includes a bracket-shaped support part, which is bolted to the bearing housing of the assembly bearing and to a crossbeam fixed to the carrier part to thereby realize a torsion-resistant bearing mount which reinforces the support structure.

DE 10 2004 034 074 B4 discloses another assembly bearing to be mounted to a subframe, with the bearing housing being secured by two screw connections, aligned in Z direction (vertical), in the node region between a longitudinal beam and a crossbeam, wherein the one screw connection is arranged on the longitudinal beam for realizing a corner-stiff bearing mount, and the other screw connection is arranged on the crossbeam. Twist stiffness of the bearing mount is, however, not significantly increased by the screw connections that lie in a common connection plane.

Furthermore, DE 10 2009 020 107 A1 discloses an arrangement of an assembly bearing on a subframe of a motor vehicle, with the assembly bearing being arranged in the corner region of the subframe between a subframe-side longitudinal member and a subframe-side cross member such as to stiffen the corner region. Formed on a bearing housing of the assembly bearing is a bearing eye, which is firmly bolted by a screw connection via a restraining bracket welded to an extension of the longitudinal member. A mounting flange of the bearing housing further rests on a support flange of a bracket of the assembly bearing and is fixed there by screw connections aligned in Z direction. The assembly bearing has a bearing core which is firmly bolted to an engine support of the assembly. The bearing core also has stop arms which are not described in greater detail and disposed diametrically opposite on the bearing core and which are associated to legs of a U-shaped stop bracket of the assembly bearing that bridges the bearing core.

Furthermore, FR 2831111 A1 discloses a multipart construction of an assembly bearing, in which a body-side fixable bearing part and an assembly-side fixable bearing part are connected indirectly via a first connecting bearing element which is swingably coupled via elastomer bearings to both bearing parts. Connected in parallel relation to this first connecting element is a further buffer and bracket element which is supported by an elastomer arrangement. Securement of the body-side bearing part is realized by screw connections aligned in both Z-direction and Y-direction.

Furthermore, JP 2012-240579 A discloses an assembly bearing in which a bearing core is surrounded by a U-shaped stop bracket, with stop buffers being provided between the inner surfaces of the stop bracket and the bearing core and acting in two spatial directions.

SUMMARY OF THE INVENTION

Object of the invention is to provide an assembly bearing arrangement for motor vehicles, which has a compact structure and yet can be produced easily in terms of manufacture and is simple to install.

According to one aspect of the invention, the object is attained by an assembly bearing arrangement for a motor vehicle, including an assembly bearing which has a bearing housing, a vibration-damping bearing, and a bearing core, connectable with a power train element, in particular an assembly support, with the bearing housing being connected torsion-resistant to at least one body-mounted carrier part via at least one, preferably several, fastening device or fastening element (the term fastening element is always used hereinafter), which is not aligned in vertical axis direction, in particular not in vehicle vertical axis direction, and involves a fastening screw or screw connection. The assembly bearing has a U-shaped stop bracket which bridges the bearing core and is fixedly connected to the bearing housing, with stop arms being formed on the bearing core in diametrically opposite relationship and spaced in a basic position from the associated legs of the stop bracket at a defined gap distance. Provision is made in accordance with the invention for the arrangement of at least one stop buffer on the inner surfaces of the stop bracket and/or the bearing core, which stop buffer acts in a defined direction, and stop buffers which are disposed between the legs of the stop bracket and the stop arms and act in a defined direction and which are arranged on the legs and/or on the stop arms.

In cooperation with the stop arms and the bearing core, travel limits which can act in longitudinal direction, in transverse direction and as mechanical stop in vertical axis direction can be realized particularly advantageously, especially in a structurally simple and easy-to-install manner, for the vibration-damping bearing in all load directions via the stop bracket. The stop buffers can be provided in a structurally simple and compact manner and with little structural size in particular between the legs and the stop arms, wherein the stop buffers may be arranged specifically on the legs and/or on the stop arms, preferably such that despite the arrangement of the stop buffers, the defined gap distances are met. Such a stop concept for an assembly bearing is thus structurally easy to realize, on one hand, and allows realization of an extremely compact structure, on the other hand.

The construction according to the invention provides further, with little additional effort, to form on the bearing housing two different connection planes (vertical and horizontal), which ensure a torsion-resistant bearing mount without use of a support part, while at the same time reinforce the body-fixed carrier part. In addition to the more weight-beneficial construction, the assembly bearing can also be mounted on the carrier part in a simple manner.

The at least one fastening element, which is not oriented in vertical axis direction, in particular not in vehicle vertical axis direction (Z direction) is preferably oriented substantially horizontally and/or formed by a screw connection. As an alternative or in addition, the at least one fastening element may lie essentially in at least one horizontal plane spanned by a transverse axis (Y axis or Y direction) and a longitudinal axis (X axis or X direction), in particular by a vehicle transverse axis and vehicle longitudinal axis. As a result, the desired beneficial force flows are established while overall the construction is rigid.

It should be expressly mentioned at this point that the axes or directions indicated above or hereinafter may relate to the assembly bearing itself or to the installed or assembled state of the assembly bearing and/or to the vehicle axes.

According to a particularly preferred configuration, the at least one fastening element, oriented essentially in vertical axis direction, in particular in vehicle vertical axis direction (Z direction), is vertically offset, especially offset downwards, in relation to the fastening element, which is not oriented in vertical axis direction, in particular vehicle vertical axis direction (Z direction), when viewed in this very vertical axis direction, in particular in vehicle vertical axis direction (Z direction). This results in the desired especially beneficial force flows at the respective assembly movements during vehicle operation.

The at least one fastening element, oriented substantially in vertical axis direction, in particular in vehicle vertical axis direction (Z direction), is preferably formed advantageously in terms of manufacture and production by a screw connection. A fastening screw of the screw connection, oriented in vertical axis direction, in particular in vehicle vertical axis direction (Z direction), may hereby be bolted in a particularly preferable manner through a screw hole in a flanged collar on the side of the bearing housing (and thus e.g. from atop) into the at least one carrier part, in particular into a threaded socket of the carrier part. As an alternative, at least one fastening screw of the screw connection, oriented in vertical axis direction, in particular in vehicle vertical axis direction (Z direction), may also be bolted through a screw hole in the at least one carrier part (and thus, for example, from below) into a flanged collar on the side of the bearing housing, in particular in a threaded bore of the bearing-housing-side flanged collar.

A platform supporting a rubber-elastic stop buffer may additionally be arranged, in particular formed, on the bearing housing, in particular on a bearing-receiving eye of the bearing housing, such that the stop buffer can be brought into operative contact with the power train element in the presence of a defined shift of the power train element. In this way, a pressure stop is provided in a simple manner to act as a travel limit to avoid overloads in the presence of an inadmissibly strong assembly deflection.

Provision is furthermore preferably made for at least one reinforcement rib, preferably several reinforcement ribs, on the bearing housing, in particular on a bearing-receiving receiving eye of the bearing housing, between the flanged collar and the platform lying above it in vertical axis direction, in particular in vehicle vertical axis direction (Z direction), to enable besides an advantageous force support also a targeted force flow in direction flanged collar or in direction of the at least one fastening element, oriented in vertical axis direction, in particular in vehicle vertical axis direction (Z direction), or Z screw connection, when subject to pressure. This means that several stiffening ribs can be provided to realize an effective force introduction from the pressure impact into the carrier part between the flanged collar with the additional fastening point and the platform overlying in vertical axis direction.

In principle, provision may furthermore be made for reinforcement ribs which are formed on the bearing housing, in particular on a bearing-receiving receiving eye of the bearing housing, in vertical axis direction, in particular in vehicle vertical axis direction (Z direction), and extend in spaced-apart relation in the circumferential direction, to effect an advantageous bearing reinforcement.

According to a particularly preferred configuration, tong-shaped jaws in diametrically opposite relation may be formed as stop arms which grip the legs of the stop bracket as defined gap distance with the interposition of a defined idle travel. The stop buffers are then also provided in this variant between the legs and the stop arms and can be arranged again on the legs and/or on the stop arms.

According to a particularly preferred specific configuration, provision is made for stop buffers acting between the legs and the stop arms in transverse axis direction (Y direction).

Furthermore, the at least one stop buffer, arranged on the inner surfaces of the stop bracket and/or the bearing core, can act in the longitudinal direction (X direction) and/or in vertical axis direction (Z direction), e.g. such as to interact directly with the bearing core at its outer surfaces, when arranged on the stop bracket. That at least one stop buffer can be vulcanized especially suitably directly on the stop bracket and/or the bearing core. The stop bracket may, for example, be placed or attached in an easy-to-install manner upon the bearing core and bolted, for example, to the bearing housing. As an alternative, the stop bracket may, optionally, also be formed integrally with the bearing housing, e.g. cast there.

According to a further advantageous configuration of the invention, the stop bracket, especially the legs of the stop bracket, and a mounting flange of the bearing housing can be secured on the carrier part via at least one, preferably several common, fastening element, preferably a fastening screw, oriented in a defined direction, particularly in transverse axis direction (Y direction). For example, a fastening screw as fastening element can be bolted from the carrier part side through the mounting flange into a threaded bore of the stop bracket. Also a reversal of the screwing direction is, of course, possible. This results in a simple and easily accessible installation of the assembly bearing on the carrier part. Also, an attachment via a screw-nut connection would, in principle, be possible.

Further, the bearing housing of the assembly bearing can be secured according to a particularly preferred further refinement via two screw connections configured in transverse axis direction (V direction), and a screw connection configured in vertical axis direction (Z direction), to a frame head of a subframe with longitudinal beams and at least one crossbeam, with the frame head having, in the area of the screw connection that is oriented in vertical axis direction, an extension which is firmly connected with the bearing housing and the or a crossbeam of the subframe.

In terms of manufacture and production, it may be advantageous to further produce the bearing housing from a same material and/or in one piece, in particular as a singe-piece casting.

Furthermore, an assembly bearing for an assembly bearing arrangement is claimed, as described above. In this way, the same advantages are realized, so that in this respect reference is made to the description made above.

BRIEF DESCRIPTION OF THE DRAWING

An exemplary embodiment of the invention will now be described in greater detail with reference to the accompanying drawings.

It is shown in.

DETAILED DESCRIPTION OF PREFERRED EMBODIMENTS

Figure 1:
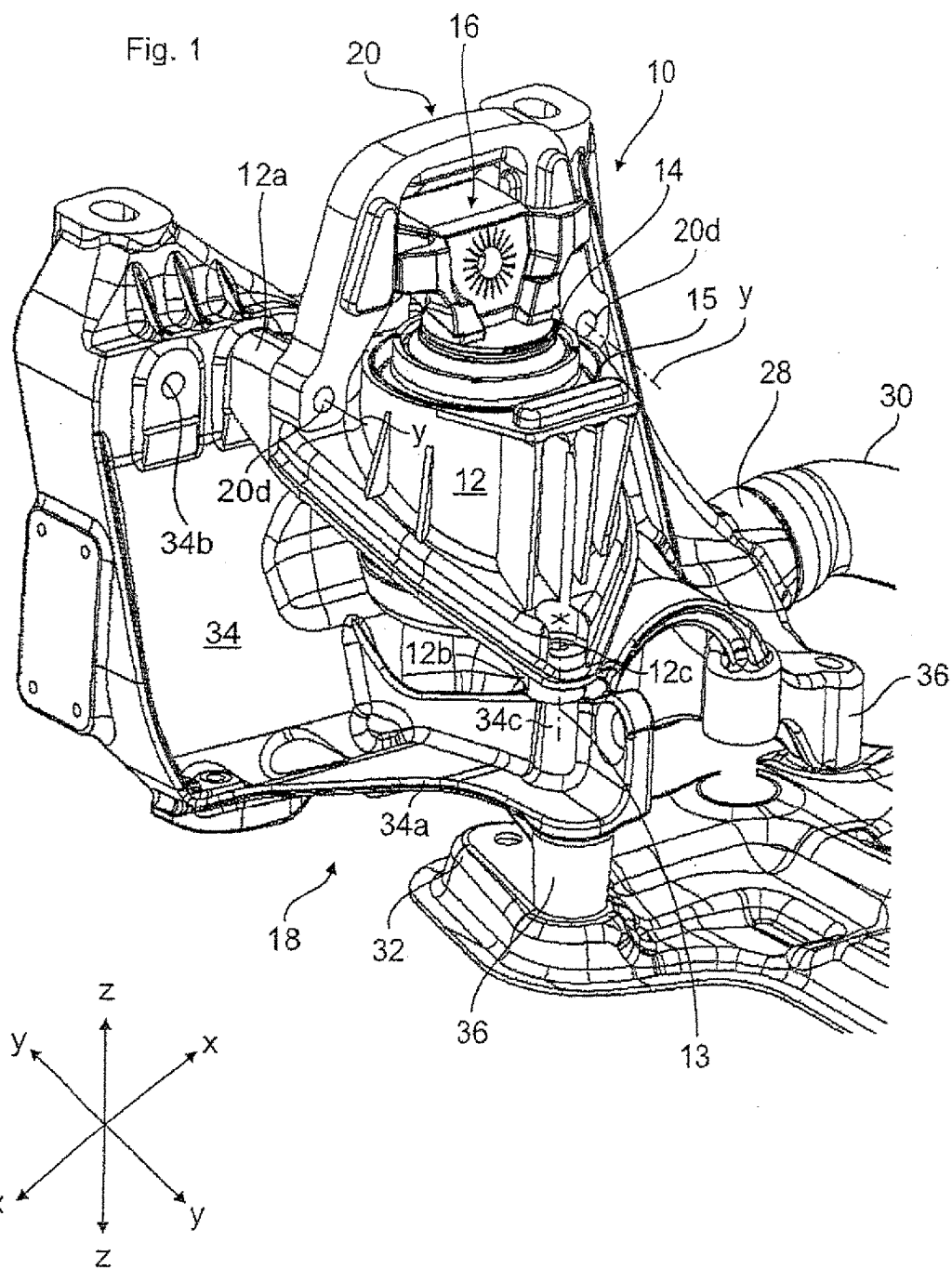
FIG. 1 a three-dimensional view of an assembly bearing to be secured by three screw connections onto a partly depicted subframe of a motor vehicle.
Figure 2:
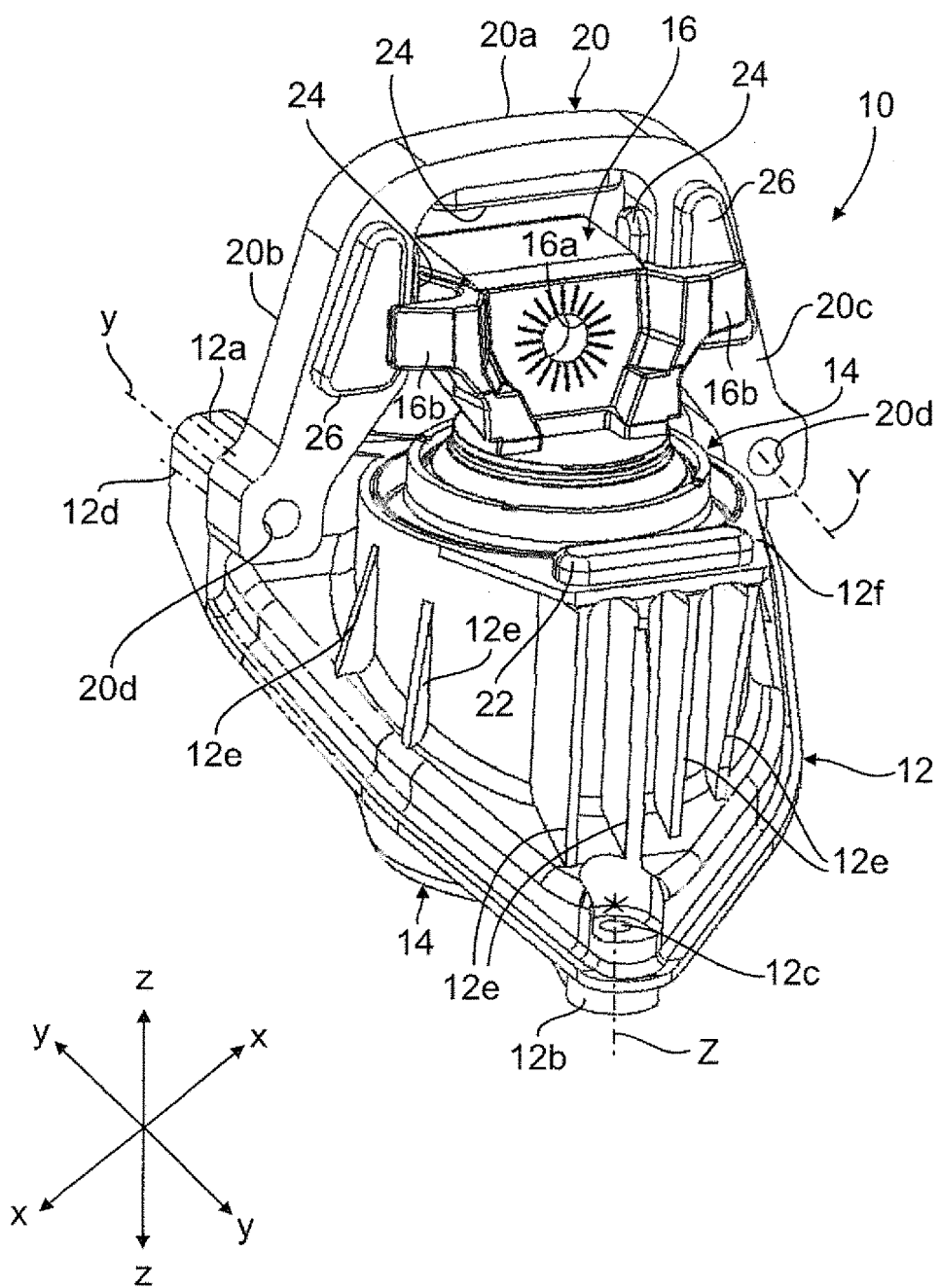
FIG. 2 an individual representation of the assembly bearing according to FIG. 1.

The assembly bearing 10 illustrated in FIGS. 1 and 2 includes an outer bearing housing 12 which, for example or preferably, is made as casting and in which a vibration-insulating bearing 14 is integrated.

The vibration-insulating bearing 14 (for example, according to FIG. 1 of DE 10 2005 033 509 B4) may involve a rubber-metal bearing and/or a hydraulically damping bearing and/or an active bearing with variable damping characteristic, and has an upwardly projecting bearing core 16 for attachment of a drive unit or power train element, for example an engine or a transmission, of the motor vehicle, in particular via a support unit (not shown). The bearing core 16 has for this purpose a threaded bore 16a and corresponding guide surfaces (unlabeled).

The bearing housing 12, which has a receiving eye 15 or is upwardly open in the form of a cup, is provided with a vertically disposed mounting flange 12a which is adjoined by an upwardly projecting, inverted U-shaped stop bracket 20 having a base portion 20a and two legs 20b, 20c (FIG. 2).

Provided in the bearing housing 12 and on the free ends of the legs 20b, 20c of the stop bracket 20 are aligned bores 12d and threaded bores 20d in the legs 20b, 20c in alignment in Y direction (here preferably the transverse direction of the motor vehicle, see coordinate system in FIG. 2) to form in a manner yet to be described the two screw connections of the bearing housing 12 in Y direction with the subframe 18 partially illustrated in FIG. 1.

Further formed on the bearing housing 12 is a flanged collar 12b which extends towards the vehicle center of the vehicle and lies in relation to the Y-screw connection vertically offset or deeper and which forms a horizontal connection plane and has a bore 12c which is aligned in Z direction (vertical) and via which the bearing housing 12 can be firmly connected to the subframe 18 by a screw connection 13 or fastening screw (shown only schematically), oriented in Z direction. The screw connection can hereby be configured such as to either be bolted from above into the subframe or bolted in opposite direction from below from the subframe into the bearing housing 12.

Provision is further made on the bearing housing 12 for several radially projecting reinforcement ribs 12e which are oriented in vertical direction and circumferentially offset, and an approximately horizontal platform 12f formed from the end face facing the bearing core 16, with several reinforcement ribs 12e extending between the flanged collar 12b and the platform 12f at the outer wall of the receiving eye 15.

The formed-on platform 12f carries a rubber-elastic stop buffer 22, which in a manner not shown forms with the assembly support, attached to the bearing core 16, a pressure stop in the Z direction and a travel limit for vibration deflections of the drive unit or the assembly support.

Further, the stop bracket 20 acts as a travel limit for vibration deflections or shifts of the power train element in Y, X and Z directions.

For that purpose, stop buffers 24 are, for example, vulcanized to the legs 20b, 20c and to the base portion 20a of the stop bracket 20 on their inner surfaces and form in direct cooperation with the outer surfaces of the approximately cube-shaped bearing core 16 travel limits which act in X direction (longitudinal direction) and in Z direction (here as a mechanical stop).

Furthermore, rubber-elastic stop buffers 26 are vulcanized, for example, on the side surfaces of the legs 20b, 20c of the stop bracket 20 and provide in cooperation with jaws 16b, which are formed on the bearing core 16 and have a defined free travel and which are tong-shaped and embrace the legs 20b, 20c, a travel limit in Y direction and thereby represent a support of the bearing 14, for example, during transverse accelerations of the motor vehicle.

The stop bracket 20 with the stop buffers 24, 26 can be placed from above over the bearing core 15 during installation of the assembly bearing 12, and then fastened. As an alternative, the stop bracket 20 could also be connected integrally with the bearing housing 12, for example by casting.

The only partially illustrated subframe 18 (FIG. 1), which in plan view is of approximately rectangular configuration, is comprised, for example, of longitudinal beams 28 (only the left longitudinal beam is visible) extending in vehicle longitudinal direction, and two crossbeams 30, 32, which, of course, may also be configured as shear section.

In this case, the longitudinal beams 28 have each an upwardly projecting frame head 34, which, e.g., may be formed as cast node, via which the subframe 18 is connected to unillustrated longitudinal members of the vehicle body. The longitudinal beams 28 transition further via curved portions into the front crossbeam 30, whereas the rear crossbeam 32, for example formed from a pressed metal sheet, is bolted to the frame heads 34 at two mounting points 36, respectively.

The frame heads 34 of the subframe 18 have extensions 34a which project approximately horizontally toward the vehicle center and are formed thereon and to which the rear crossbeam 32 is secured and the screw connection 13, oriented in Z direction, is configured with the bearing housing 12 of the assembly bearing 10.

To secure the assembly bearing 10 and its bearing housing 12 to the subframe 18 or to the frame head 34 formed as casting, bores 34b (only an exposed bore, provided for shifting the assembly bearing 10, is visible) are provided in the frame head 34 in Y direction via which bores the bearing housing 12 can be secured by respective fastening screws (not shown) through the bores 12d in the attachment flange 12a and via the threaded bores 20d in the stop bracket 20. As an alternative, provision could also be made for a screw-nut connection instead of the thread in the bores 20d.

Furthermore, the extension 34a of the frame head 34 is formed with a threaded receptacle 34c into which the fastening screw 13 can be bolted through the flanged collar 12b and the bore 12c of the bearing housing 12 in Z direction or vertically from top to bottom.

The bearing housing 12 is thus connected in a torsion-resistant manner with the frame heads 34 or the subframe 18 by three fastening screws or by two connection planes Y-Z which are vertically offset in relation to one another and substantially inclined at a right angle.

The bearing housing 12 may be formed, as shown, in one piece or, optionally, as known from DE 10 2005 033 509 B4 from several parts. Instead of the described three-point attachment, the provision of optionally four screw connections, offset as described, may be appropriate.

The invention claimed is:

1. An assembly bearing arrangement for a motor vehicle, comprising an assembly bearing which includes:
   a bearing housing;
   at least one first fastening element, oriented in a direction that differs from a vertical direction, for torsion-resistant connection of the bearing housing to at least one body-fixed carrier part;
   at least one second fastening element, oriented substantially in the vertical axis direction, for connection of the bearing housing to the carrier part;
   a vibration-damping bearing accommodated in the bearing housing;
   a bearing core configured for connection to a power train element and formed with diametrically opposite stop arms;
   a U-shaped stop bracket configured to bridge the bearing core and firmly connected to the bearing housing, said stop bracket having legs, with the stop arms of the bearing core being spaced in a basic position from the legs of the stop bracket by a defined gap distance;
   at least one first stop buffer arranged on an inner surface of the stop bracket and/or the bearing core and acting in a defined direction; and
   second stop buffers arranged on the legs of the stop bracket and/or on the stop arms of the bearing core between the legs and the stop arms and acting in a defined direction.

2. The assembly bearing arrangement of claim 1, wherein the first fastening element is substantially aligned horizontally and/or formed by a screw connection and/or lies substantially in at least one horizontal plane spanned by a transverse axis (Y axis) and a longitudinal axis (X axis).

3. The assembly bearing arrangement of claim 1, wherein the transverse axis is a vehicle transverse axis, and wherein the longitudinal axis is a vehicle longitudinal axis.

4. The assembly bearing arrangement of claim 1, wherein the second fastening element is vertically offset in relation to the first fastening element, as viewed in the vertical axis direction.

5. The assembly bearing arrangement of claim 4, wherein the second fastening element is vertically offset downwards in relation to the first fastening element.

6. The assembly bearing arrangement of claim 1, wherein the second fastening element is formed by a screw connection.

7. The assembly bearing arrangement of claim 6, wherein the bearing housing has a flanged collar having a screw hole, said screw connection including a fastening screw bolted via the screw bore of the flanged collar into the at least one carrier part.

8. The assembly bearing arrangement of claim 6, wherein the bearing housing has a flanged collar, said screw connection being a fastening screw bolted via a screw bore in the at least one carrier part into the flanged collar.

9. The assembly bearing arrangement of claim 8, further comprising a platform arranged on the bearing housing and supporting a rubber-elastic third stop buffer such that the third stop buffer is able to come into operative contact with the power train element when the power train element shifts by a defined distance.

10. The assembly bearing arrangement of claim 9, wherein the platform is formed on a receiving eye of the bearing housing for receiving the bearing.

11. The assembly bearing arrangement of claim 9, wherein the bearing housing has a flanged collar, and further comprising at least one reinforcement rib provided on the bearing housing between the flanged collar and the platform, said platform lying above the flanged collar in the vertical axis direction.

12. The assembly bearing arrangement of claim 11, wherein the at least one reinforcement rib is provided on a receiving eye of the bearing housing for receiving the bearing.

13. The assembly bearing arrangement of claim 1, further comprising reinforcing ribs formed on the bearing housing and extending in the vertical axis direction in circumferential spaced-apart relationship.

14. The assembly bearing arrangement of claim 13, wherein the reinforcement ribs are provided on a receiving eye of the bearing housing for receiving the bearing.

15. The assembly bearing arrangement of claim 1, wherein the stop arms of the bearing core are formed by diametrically opposite tong-like jaws which embrace the legs of the stop bracket at a defined gap distance there between to establish a defined free travel.

16. The assembly bearing arrangement of claim 1, wherein the second stop buffers between the legs of the stop bracket and the stop arms of the bearing core act in a transverse axis direction (Y direction).

17. The assembly bearing arrangement of claim 1, wherein the first stop buffer acts in a longitudinal direction (X direction) and/or in the vertical axis direction.

18. The assembly bearing arrangement of claim 1, wherein the bearing housing has a mounting flange, said stop bracket and said mounting flange being secured to the carrier part via at least one common fastening element, oriented in a defined direction.

19. The assembly bearing arrangement of claim 18, wherein the legs of the stop bracket and the mounting flange are secured to the carrier part.

20. The assembly bearing arrangement of claim 18, wherein the defined direction in which the common fastening element is oriented, is a transverse axis direction (Y direction).

21. The assembly bearing arrangement of claim 18, wherein the fastening element is a fastening screw.

22. The assembly bearing arrangement of claim 1, wherein the bearing housing is secured to a frame head as carrier part of a subframe having longitudinal beams and at least one crossbeam via two first screw connections in a transverse axis direction (Y direction) and a second screw connection in the vertical axis direction, with the frame head having in an area of the first screw connection an extension which is firmly connected with the bearing housing and the crossbeam of the subframe.

23. The assembly bearing arrangement of claim 1, wherein the bearing housing is made from a same material and/or formed in one piece.

24. The assembly bearing arrangement of claim 1, wherein the bearing housing is formed, as a single-piece casting.

25. An assembly bearing for an assembly bearing arrangement, comprising:
   a bearing housing;
   at least one first fastening element, oriented in a direction that differs from a vertical direction, for torsion-resistant connection of the bearing housing to at least one body-fixed carrier part;
   at least one second fastening element, oriented substantially in the vertical axis direction, for connection of the bearing housing to the body-fixed carrier part;
   a vibration-damping bearing accommodated in the bearing housing;

a bearing core configured for connection to a power train element and formed with diametrically opposite stop arms;

a U-shaped stop bracket configured to bridge the bearing core and firmly connected to the bearing housing, said stop bracket having legs, with the stop arms of the bearing core being spaced in a basic position from the legs of the stop bracket by a defined gap distance;

at least one first stop buffer is arranged on an inner surface of the stop bracket and/or the bearing core and acting in a defined direction; and second stop buffers arranged on the legs of the stop bracket and/or on the stop arms of the bearing core between the legs and the stop arms and acting in a defined direction.

* * * * *